United States Patent [19]

Doeksen

[11] 3,961,752

[45] June 8, 1976

[54] METHOD AND APPARATUS FOR DUST CONTROL TREATMENT

[75] Inventor: Gerard Doeksen, Montrose, Canada

[73] Assignee: Cominco Ltd., Vancouver, Canada

[22] Filed: Mar. 28, 1975

[21] Appl. No.: 563,243

[30] Foreign Application Priority Data

July 22, 1974 Canada .............................. 205262

[52] U.S. Cl. .................................. 239/1; 239/209; 239/231; 239/246; 239/289; 239/556; 118/303; 404/76; 134/181

[51] Int. Cl.² ..................... B05B 3/14; B05B 15/04; B08B 3/02; E01C 7/36

[58] Field of Search ................... 239/1, 13, 66, 102, 239/209, 210, 225, 231, 232, 239, 242, 246, 249, 289, 550, 556, 566; 104/18; 105/355, 406 R, 364; 117/105.3; 118/303; 214/17 R, 17 A, 38 R; 404/76; 134/198, 199, 180–183, 188, 191

[56] References Cited
UNITED STATES PATENTS

| | | | |
|---|---|---|---|
| 752,487 | 2/1904 | Van Westrum | 404/76 X |
| 813,389 | 2/1906 | Sandison | 404/76 |
| 1,770,051 | 7/1930 | Thorn et al. | 118/303 X |
| 1,995,598 | 3/1935 | Archibald | 404/76 |
| 2,195,573 | 4/1940 | Kritchevsky | 404/76 |
| 2,595,702 | 5/1952 | Prevost | 239/566 X |
| 3,038,482 | 6/1962 | Mylting et al. | 118/303 X |
| 3,259,138 | 7/1966 | Heinicke | 134/181 X |
| 3,701,356 | 10/1972 | Hanna et al. | 134/181 X |
| 3,773,266 | 11/1973 | Raefield | 239/556 X |

Primary Examiner—Robert S. Ward, Jr.
Attorney, Agent, or Firm—Arne I. Fors

[57] ABSTRACT

Absorption of treatment composition into a surface layer of particulate material in a moving bed is substantially increased by spraying a major portion of the composition through a first group of nozzles and a minor portion of the composition through a second group of nozzles, the nozzles being attached to the top of a common transverse spray header which is oscillated across the moving bed. The first group of nozzles directs a plurality of substantially parallel vertical jets onto the surface of the moving bed to form therein, on combined motion of the bed and spray header, a zigzag pattern of trenches. The treatment composition is retained in these trenches as it is absorbed by adjoining particulate material. Loss of treatment composition due to run-off over a sloping or insufficiently wetted surface is avoided. The second group of nozzles is provided with deflectors which cause downwardly discharging fluid to fan out in spray curtains which together extend across the moving bed to ensure wetting of areas between the zigzag trenches.

9 Claims, 4 Drawing Figures

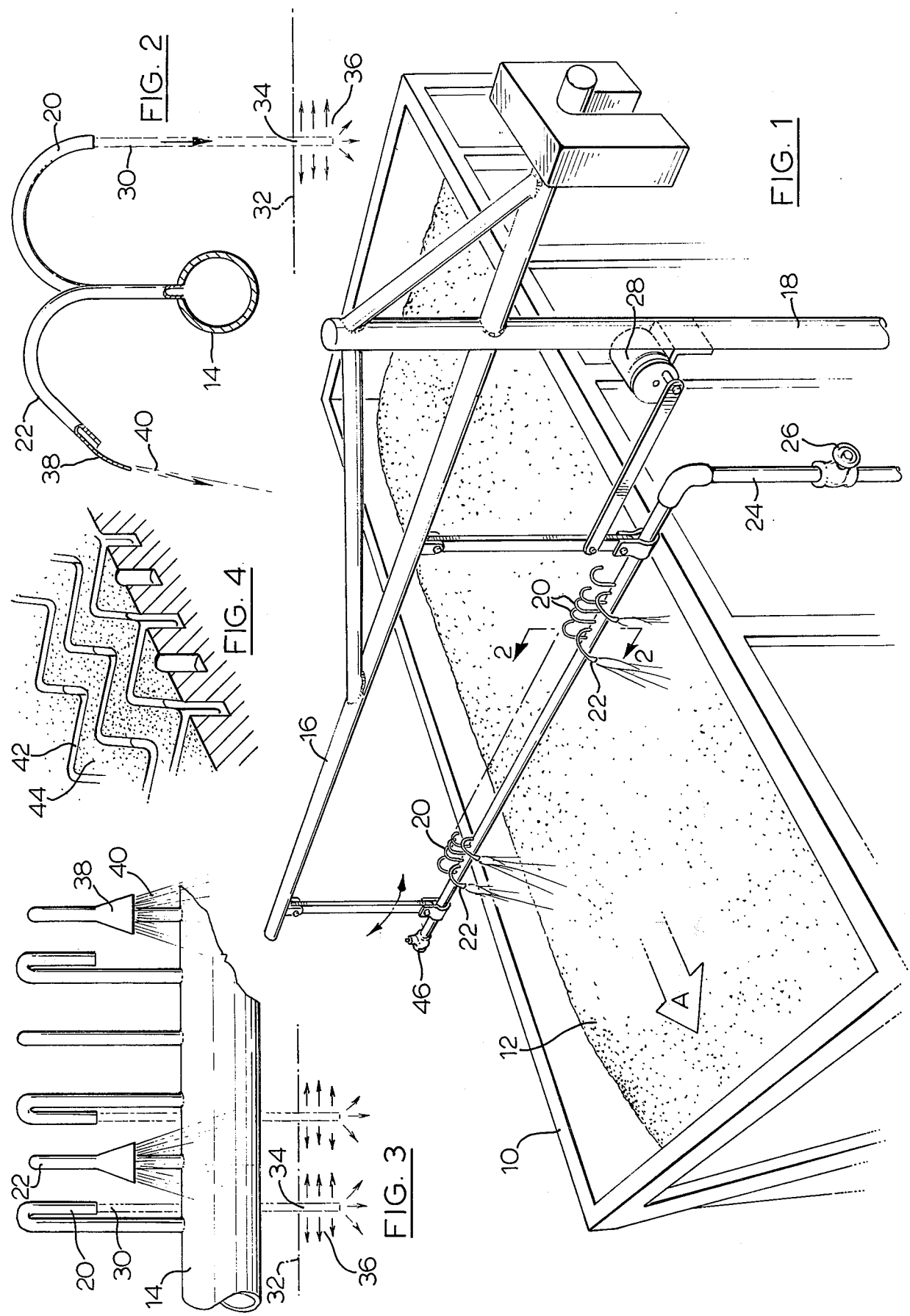

METHOD AND APPARATUS FOR DUST CONTROL TREATMENT

BACKGROUND OF THE INVENTION

This invention relates to a method of dust-control treatment of particulate material in open top hopper cars by spraying with a fluid composition which penetrates the surface of the material to bind particles into an adhesive, protective layer, the surface penetration occurring before effectiveness of the composition is lost due to run-off over a sloping or insufficiently wetted surface.

Although applicable to other particulate materials, this invention will be described in relation to the treatment of coal to prevent dust losses due to the action of wind on rapidly moving unit trains. Canadian Patent Application No. 886,069 describes a method of coal treatment in which an aqueous composition containing at least about 2.5% of a binder material consisting of solid material in an aqueous suspension of an asphalt emulsion or a black liquor lignin product containing 0.1 to 2.0% of an appropriate wetting agent results in the formation of a crust layer which provides protection against such wind action. Rapid wetting of the coal surface due to use of the selected wetting agent makes it possible to apply about 50 gallons of treatment composition to the surface of coal in a car as the car advances at a speed of about 0.5 mile per hour. Simple, single jet spray means was used. It was observed that the use of larger quantities of binding composition resulted in the thicker crusts and more effective protection. However, with a moving train, such larger quantities had to be applied more rapidly than they could be completely absorbed into the coal bed.

The present invention provides means of spraying which ensures rapid, deep penetration of surface coal. The quantity of treatment composition which can be effectively applied to the surface of the coal as a car moves under a spray header is substantially increased.

There are many known methods of spraying liquids and coatings onto surfaces. However, these do not meet the requirements of the present situation in which the surface of coal in open top gondola cars must be wetted sufficiently in the time the car passes under the header to provide an adequately bonded protective layer. The problem of run-off of wetting composition is intensified at the ends of the cars where the coal surface slopes downwardly, particularly when spraying is done immediately after loading from a hopper under which the moving cars pass. Although delay of spraying until car motion causes settling and levelling of the coal would decrease run-off, maintenance of spraying facilities some distance from loading facilities would be more costly.

The following patents may be considered to be relevant prior art to the present invention.

U.S. Pat. No. 3,237,598 provides means for oscillating a spray nozzle header used for applying a coating composition to an article.

U.S. Pat. No. 3,282,273 relates to equipment for pneumatic spraying of a liquid onto workpieces in which a sprayhead is moved reciprocally across a spraying chamber at right angles to the direction of movement of the workpieces. The combined motions provide uniform distribution of the sprayed liquid.

A sub-soil irrigation device of U.S. Pat. No. 3,289,418 comprises a plurality of water injecting nozzles directed downwardly from a manifold, each nozzle being within a tubular body which pierces the soil. Water is discharged as each tubular body enters the soil.

The spray nozzle of U.S. Pat. No. 3,292,868 has a deflector plate extending forwardly from the nozzle.

U.S. Pat. No. 3,318,725 provides for the impregnating of wood or other porous material with a treating solution. A fine, high pressure jet of liquid forms a hole of predetermined depth in the workpiece. The liquid enters the hole and diffuses laterally into the workpiece.

In the apparatus of U.S. Pat. No. 3,351,291, a flexible deflector is mounted at the end of a nozzle to provide variable redirection and dispersion of effluent from the nozzle.

U.S. Pat. No. 3,431,889 relates to apparatus which provides downward application of fluid onto a flat moving surface. The fluid is distributed by a plurality of capillary tubes extending down from a horizontal pipe.

U.S. Pat. No. 3,591,091 provides a deflector-type spray nozzle which is attached, with a changeable orifice, to the top of a supply pipe.

OBJECTS OF THE INVENTION

It is the principal object of the present invention to apply a treatment composition to a moving bed of particulate material by spraying in jets from a plurality of downwardly directed tubular nozzles attached to a common transverse header so that the jets cut grooves or trenches in the material surface from which trenches the composition disperses into the surrounding material.

It is also an object of the invention to apply the treatment composition in a zigzag pattern of trenches which restrict direct flow of fluid down inclined portions of the bed of particulate material.

It is an additional object of the invention to provide from the same header dispersed sprays of treatment composition from auxiliary nozzles to ensure complete coverage of the areas between the trenches cut by the jets.

It is a further object of the invention to spray particulate material in a number of cars successively without treatment composition dripping between cars.

SUMMARY OF THE INVENTION

The foregoing objects are achieved by the method and apparatus of the invention for applying a fluid treatment composition to a moving bed of particulate material which generally comprises spraying a major portion of a composition of an aqueous binder material and a wetting agent through a first group of nozzles and a minor portion of said composition through a second group of nozzles onto said moving bed, said nozzles being attached to the top of a common transverse spray header, oscillating said header across said moving bed during said spraying, directing through said first group of nozzles a plurality of substantially parallel vertical jets of said major portion onto the surface of said moving bed to penetrate said surface and form therein a zigzag pattern of trenches, retaining treatment composition in said trenches until absorbed by adjoining particulate material, and directing by means of deflectors attached to said second group of nozzles said minor portion in adjoining spray curtains which together extend transversely across said moving bed to ensure wetting of areas between the zigzag trenches formed by jets from the first group of nozzles.

BRIEF DESCRIPTION OF THE DRAWINGS

The apparatus and method of the invention will now be described in detail, reference being made to the following drawings.

FIG. 1 is a perspective view of the spraying arrangement;

FIG. 2 is an enlarged transverse section of the spray header and the bed of particulate material in a car, taken along line 2—2 of FIG. 1;

FIG. 3 is a longitudinal view of a portion of the spray header shown in FIG. 2; and FIG. 4 is a perspective view of a section of the surface of particulate material at one end of a car showing the penetration pattern formed by a plurality of jets.

DESCRIPTION OF THE PREFERRED EMBODIMENTS

A preferred embodiment of the invention, the spraying of a treatment composition onto coal in hopper cars, will now be described. As shown in FIG. 1, coal car 10 containing coal bed 12 is advancing in the direction of arrow A under spray header 14 which extends transversely above car 10, suspended from horizontally pivotable boom 16, which in turn is supported by shaft 18. Header 14 is free to move horizontally and means is provided to cause it to oscillate parallel to the boom. Spaced openings along the top of spray header 14 are provided with a first group of tubular nozzles 20 which direct a major portion of the treatment composition onto the coal as the coal approaches the header, and with a second group of tubular nozzles 22 which direct a minor portion of the treatment composition onto the coal as it moves away from header 14. Inlet hose 24 to header 14 is connected to a control valve 26 through which the fluid composition for coal treatment is pumped. Horizontal oscillation of spray header 14 may be provided by any convenient means, e.g. eccentric drive 28 mounted on shaft 18. When not in use the header may be pivoted out of the path of moving trains.

As shown in FIGS. 2 and 3, each spray nozzle 20 is shaped to direct a vertical jet 30 of treatment composition onto surface 32 of coal bed 12. Depending on the quantity and pressure of flow of fluid through nozzle 20 and on the particle size distribution of the coal, jet 30 penetrates surface 32 to a depth of 1 to 2 inches to form, on movement of the coal bed and header 14, trench 34 which acts as a reservoir. Fluid from jet 30 is retained in trench 34 until it disperses into the coal bed, laterally and downwardly as indicated by arrows 36. Each spray nozzle 22 is curved to discharge in a generally downward direction to discharge fluid against a deflector 38 attached to its upper side. The discharging fluid fans out into a screen or curtain 40 which extends transversely across a portion of the coal car. Adjoining spray curtains together extend across the moving coal bed.

As coal bed 12 advances with the moving train and spray header 14 oscillates across the width of the car, a jet 30 cuts a zigzag trench 42 (FIG. 4) in the surface of the coal. Substantially parallel jets from a plurality of spaced nozzles 20 form a pattern of parallel trenches 42. Fluid from adjoining spray curtains 40 ensures wetting of areas 44 between trenches 42.

In order to wet the full width of the coal bed while keeping the sprayed material within car 10, the length of header 14 plus the amplitude of its oscillation approaches but does exceed the width of the car. Nozzles 20 are closely spaced along the length of spray header 14 to provide enough trenches to increase the retention time of a required quantity of treatment composition to ensure its penetration into the coal bed and absorption by adjoining particulate material. Without use of these nozzles, it is difficult to apply to a moving car a quantity of treatment composition which provides adequate protection against wind loss during train travel. With use of nozzles 20, the quantity of treatment composition retained by the surface coal is substantially increased without run-off occurring. It is not necessary to install additional equipment for subsequent auxiliary spraying after initial dispersal of a lesser quantity of material. By causing moving fluid to follow tortuous paths down sloping coal surfaces, the zigzag pattern of trenches is a particularly valuable means of effecting absorption at the ends of the car (FIG. 4).

I obtained effective coverage of coal in a 9.5 foot wide car with about 48 nozzles 20 spaced 2 to 2.5 inches apart on a 9 foot long header which moved reciprocally a distance of 6 inches about 60 to 100 times per minute. Nozzles of open tubing 3/16 inch in diameter with a ⅛ inch bore or ¼ inch diameter with a 3/16 inch bore were effective. Six nozzles 22 of like tubing and deflectors, about 18 inches apart, provided sufficient dispersed spray to span the width of the coal bed. These nozzles were almost completely free of plugging which would cause difficulty in more complex structures. Cleaning, when necessary, was effected by simply pushing a wire through the tubing. I also operated effectively with 9 inch spacing between adjacent nozzles 20 and with 8 inch spacing between adjacent nozzles 22.

At a train speed of 1.0 mile per hour, 0.57 minute is required to spray the full length of the coal bed in a 50 foot long car without spilling beyond the length of the car. At 0.4 mile per hour, a spraying time of 1.42 minutes is required. With the present arrangement, substantial quantities of treatment composition can be applied within the time the coal in a car passes under the spray header without use of high pressure at the header. At a pump delivery rate of 50 Imperial gallons per minute and using nozzles with 3/16 inch bore I applied 70 gallons of fluid to a car moving at 0.4 mile per hour without run-off. In this test the spray header was oscillated at 60 cycles per minute and was under 8.5 p.s.i. pressure. At 0.2 mile per hour, 140 gallons were applied, but some run-off occurred. I also applied 120 gallons per car to a train moving at 0.8 mile per hour, without run-off. At this rate the header was under about 20 p.s.i. pressure.

High pressure application of treatment composition leads to foaming which can be controlled by addition of a defoamer. At the lower pressures of the present procedure and by using the spray pump in a closed circuit to effect mixing of components, the tendency to foam is substantially decreased or eliminated. Foam does not appear to decrease the speed of absorption of fluid by the coal bed, but it does preclude accurate measurement of the quantity being applied.

The apparatus of the present invention contains no complex nozzle structures. Rare occurrence of nozzle plugging may be overcome simply by pushing a wire through the tube. Any accumulation of solids in the header may be overcome by opening valve 46 and purging the header. Since spraying is done through relatively small diameter tubes connected to the top of the header, immediate stoppage of flow occurs when the control valve is closed. This arrangement eliminates any siphoning effect that would result from connecting the tubes to the bottom of the header and is particularly valuable in avoiding spillage in the interval between completion of the spraying of one car and the advancement of the next car to the spraying station. Assured retention of larger quantities of spray in the contacted areas of the coal surface permits treatment at the car loading speed. Spraying controls may be synchronized with the successive loading of a number of cars.

The apparatus and method of the present invention have been used for applying compositions such as oil and aqueous emulsions of asphalt, black liquor lignin product and tar sands froth to coal in hopper cars. All these products, with appropriate wetting agents, may be applied by the present method to provide effective protection against loss of surface coal by wind action during train travel. The methods of the present invention provide effective protection of very fine coal, e.g. coal which is predominantly less than 28 mesh.

What I claim as new and desire to protect by Letters Patent of the United States is:

1. A method of applying a fluid treatment composition to a moving bed of particulate material which comprises spraying a major portion of a composition of an aqueous binder material and a wetting agent through a first group of nozzles and a minor portion of said composition through a second group of nozzles onto said moving bed, said nozzles being attached to the top of a common transverse spray header, oscillating said header across said moving bed during said spraying, directing through said first group of nozzles a plurality of substantially parallel vertical jets of said major portion onto the surface of said moving bed to penetrate said surface and form therein a zigzag pattern of trenches, retaining treatment composition in said trenches until absorbed by adjoining particulate material, and directing by means of deflectors attached to said second group of nozzles said minor portion in adjoining spray curtains which together extend transversely across said moving bed to ensure wetting of areas between the zigzag trenches formed by jets from the first group of nozzles.

2. A method as claimed in claim 1 wherein said particulate material is coal in an open top hopper car and said fluid treatment composition is an aqueous composition of a binder material and a wetting agent.

3. A method as claimed in claim 2, said car moving at a speed of 0.2 to 1 mile per hour, said spray header oscillating 60 to 100 times per minute.

4. A method as claimed in claim 3, the oscillations of said spray header having an amplitude of about 6 to 9 inches, the length of said header plus said amplitude approaching but not exceeding the width of said car, and said first group of nozzles being spaced about 2 to 2.5 inches apart.

5. A method as claimed in claim 1 wherein said zigzag pattern of trenches restricts direct flow of treatment composition down inclined portions of the surface of said bed of particulate material.

6. A method as claimed in claim 2 wherein successive spraying of a number of cars in a train is synchronized with the loading of said cars to provide stoppage of flow of said treatment composition in the intervals between completion of the spraying of one car and the advancement of the next car to the spraying station.

7. Apparatus for the application of a fluid treatment composition to a moving bed of particulate material comprising a first group and a second group of nozzles attached to a horizontal spray header which is adapted to oscillate across the moving bed, said first group of nozzles being a plurality of closely spaced tubes which receive a major portion of said fluid composition from spaced openings along the top of said header and are adapted to direct this major portion in a plurality of substantially parallel vertical jets onto said bed to form on combined motion of the bed and the spray header a zigzag pattern of trenches in the surface of the bed and said second group of nozzles being tubes which receive a minor portion of said fluid composition from openings along the top of the header and are provided with deflectors to fan out downwardly discharging fluid in spray curtains which together extend transversely across said moving bed.

8. Apparatus as claimed in claim 7, the tubes comprising said nozzles having inside diameter about ⅛ to 3/16 inch.

9. Apparatus as claimed in claim 7, said first group of nozzles being spaced about 2 to 2.5 inches apart and said second group of nozzles being spaced about 8 to 18 inches apart.

* * * * *